Figure 1:
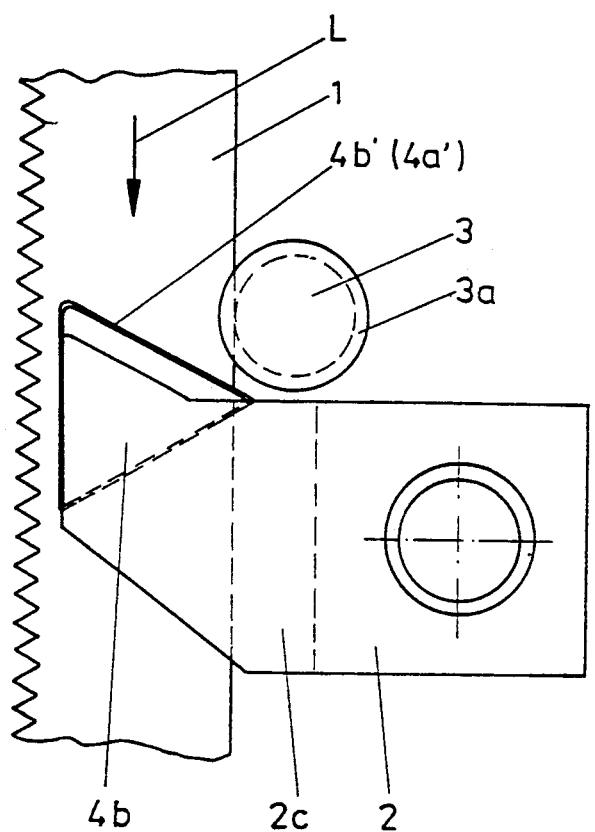

United States Patent [19]
Rosenberger et al.

[11] Patent Number: 5,119,705
[45] Date of Patent: Jun. 9, 1992

[54] SAW BAND GUIDE

[75] Inventors: Jörg Rosenberger, Haltern-Flaesheim; Franz Book, Haltern, both of Fed. Rep. of Germany

[73] Assignee: Heinz Nienstedt Maschinenfabrik GmbH, Haltern, Fed. Rep. of Germany

[21] Appl. No.: 658,282

[22] Filed: Feb. 20, 1991

[30] Foreign Application Priority Data

Mar. 23, 1990 [DE] Fed. Rep. of Germany ....... 4009405

[51] Int. Cl.$^5$ ........................................... B26D 1/54
[52] U.S. Cl. ........................................... 83/162; 83/820
[58] Field of Search ................. 83/105, 162, 168, 820, 83/821, 824, 825, 827, 828, 829, 661

[56] References Cited

U.S. PATENT DOCUMENTS

| | | | |
|---|---|---|---|
| 425,105 | 4/1890 | McChesney | 83/824 |
| 2,311,426 | 2/1943 | Wilkie | 83/828 X |
| 2,850,053 | 9/1958 | Voss | 83/824 |
| 3,109,465 | 11/1963 | Smith | 83/824 |
| 3,817,142 | 6/1974 | Fingerle et al. | 83/820 |
| 3,872,762 | 3/1975 | McKillip et al. | 83/820 |
| 4,920,856 | 5/1990 | Duginske et al. | 83/820 |

FOREIGN PATENT DOCUMENTS

| | | |
|---|---|---|
| 8228862 | 1/1983 | Fed. Rep. of Germany . |
| 3623962 | 1/1988 | Fed. Rep. of Germany . |

Primary Examiner—Frank T. Yost
Assistant Examiner—Eugenia A. Jones
Attorney, Agent, or Firm—Sprung, Horn, Kramer & Woods

[57] ABSTRACT

The invention relates to a saw band guide, comprising a supporting roller 3 supporting the saw band at its unserrated rear edge, and a guide fork 2 whose fork branches 2a, 2b, bearing hard metal plates 4a, 4b, form a guide gap in which the saw band 1 is guided laterally with its surface bearing against the hard metal plates 4a, 4b and which forms on the rear side an opening 2c into which sawn material stripped off by the hard metal plates 4a, 4b is conveyed.

6 Claims, 1 Drawing Sheet

SAW BAND GUIDE

The invention relates to a saw band guide, comprising a supporting element, more particularly a supporting roller supporting the unserrated rear edge of the saw band, and a guide fork between whose fork branches, fitted on the inside with hard metal bodies, the saw band is guided with its sides bearing against the hard metal bodies, taking the form of plates having large-area bearing surfaces facing one another, their front edges facing the direction in which the saw band runs enclosing an obtuse angle therewith.

Band saws are used for cutting deep-frozen blocks of foodstuffs, more particularly deep-frozen blocks of fish, into portions. So as to avoid heavy cutting losses in the use of such band saws and obtain portions with small weight tolerances, the saw bands must not only be very thin, but they must be guided without wobble as close as possible to the block. One prior art saw band guide of the kind specified fails to meet these requirements to the optimum extent. Each of the fork branches is equipped with a narrow hard metal body disposed at an inclination to the direction in which the saw band runs, the two hard metal bodies being disposed crosswise in relation to one another. During the operation of such a saw band guide it was found that in the zone of the crossing point the hard metal bodies and the band are subject to increased wear, leading to a reduction in the lateral guiding of the saw band, which in any case is inherently non-optimum. However, saw band lateral guides are used not only for this purpose, but also for other purposes. In one prior art saw band (German patent specification No. 36 23 969 A1) two saw band guides of the kind specified are disposed at a distance from one another to twist the roller-guided saw band through 90° and then twist it back, so that in the zone between the two saw band guides the serrated front edge of the band faces the material for sawing. In this case the arrangement of the front edge of the hard metal body of the first saw band guide in the direction in which the band runs, and of the rear edge of the hard metal body of the second saw band guide in said direction serves for geometrical adaptation to the twisted band.

In another prior art saw band guide (German Utility Model 82 28 862.3), in which the saw band is not twisted, the band is guided between the fork branches of a block, its rear side bearing against a hard metal insert. To prevent the sawn material from reaching the zone of support, the front edges of the fork branches are constructed at an inclination such that the sawn material is guided in the direction of cutting. Such removal of the sawn material may lead to malfunctionings at the cutting edge.

It is an object of the invention to provide a saw band guide which gives the saw band very high precision lateral guiding over a long service life. More particularly, the sawn material accumulating during sawing causes no trouble in the cutting zone. This problem is solved according to the invention by the features that the guide fork has an opening at the rear edge of the band, and the plate front edges lie in the plane of the bearing surfaces and so enclose the obtuse angle with the band front edge that the sawn material stripped off the saw band by the plate front edges is conveyed into the opening.

In contrast with the prior art saw band guide, in the saw band guide according to the invention the band is guided not only at points, but over a large area. The orientation of the front edges ensures that during the running of the saw band a component of force is established which acts against the supporting element, so that there is no risk of the band being lifted off the supporting element. Moreover, the special orientation of the front edges, in conjunction with the narrow-area band guide, ensures that sawn material sticking to the band is substantially stripped off and removed and does not get in between the plates. The deflected sawn material is guided in the direction of the rear edge of the band, where there is enough space available between the fork branches for the further removal of the sawn material without the risk of clogging. The stripping effect of the front edges of the plates in relation to the sawn material sticking to the saw band can be further enhanced by the feature that the front edges are chamfered towards the side remote from the saw band.

Preferably, the hard metal bodies are triangular plates. The guide gap between the plates has particularly narrow tolerances if, according to another feature of the invention, the plates consist of a block which is anchored between the fork branches and is parted in the center, more particularly by means of a laser beam, to form the guide gap for the saw band.

Figure 3:
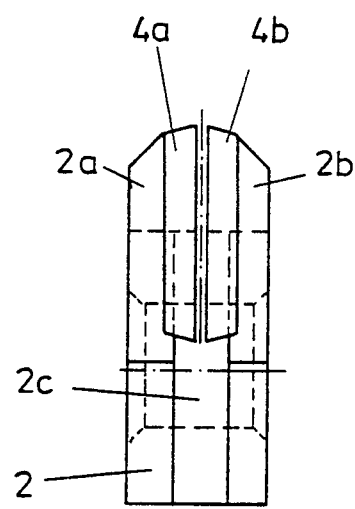
Figure 2:
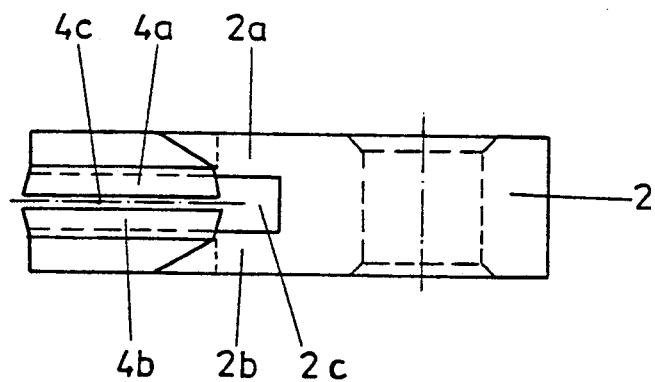

An embodiment of the invention will now be described in greater detail with reference to the drawings, wherein:

FIG. 1 is a side elevation of a saw band guide comprising a supporting roller and a guide fork, FIG. 2 is a plan view of the guide fork of the saw band guide illustrated in FIG. 1, and FIG. 3 is a front elevation of the guide fork of the saw band guide illustrated in FIG. 1.

Referring to the drawings, a saw band guide for a saw band 1 is disposed in a holder (not shown) and comprises a guide fork 2 and a supporting roller 3. The saw band 1 is borne via its unserrated rear edge in a groove 3a in the supporting roller 3. The guide fork 2 has two fork branches 2a, 2b fitted on the inside with triangular hard metal plates 4a, 4b. The hard metal plates 4a, 4b are soldered to the fork branches 2a, 2b. They are made from a soldered-on block which is parted by means of a laser beam to form a guide gap 4c. The fork branches 2a, 2b with the soldered-on plates 4a, 4b are bent upwards against the direction L in which the saw band 1 runs. The result is a geometrical configuration in which the edge of each plate 4a, 4b, extending parallel with the saw teeth and adjacent thereto, and the front edge 4a', 4b', of each plate 4a, 4b facing the direction L in which the band runs enclose an obtuse angle with the direction L. The edges, more particularly the aforementioned edges of the plates 4a, 4b are chamfered towards the rear side, this feature mainly facilitating the stripping-off of sawn material sticking to the saw band. The stripped-off sawn material is conveyed in the direction of the rear edge of the saw band 1, where it is removed through the wide opening 2c between the fork branches 2a, 2b.

We claim:

1. In a saw band guide, comprising a roller (3) supporting an unserrated rear edge of a saw band, and a guide fork (2) having fork branches (2a, 2b) having insides fitted with hard metal bodies (4a, 4b), between which branches (2a, 2b) the saw band (1) is guided with its sides bearing against the hard metal bodies (4a, 4b) which are in the form of plates having large-area bearing surfaces facing one another, with front edges (4a', 4b') facing the direction (L) in which the saw band runs defining an obtuse angle therebetween, the improvement which comprises providing the guide fork (2) with an opening (2c) at the rear edge of the band, the plate front edges (4a', 4b') lying in the plane of the bearing surfaces and so defining said obtuse angle with a front edge of the band that the sawn material stripped off the saw band (1) by the plate front edges (4a', 4b') is conveyed into the opening (2c).

2. A saw band guide according to claim 1, wherein the front edges (4a', 4b') are chamfered towards the side remote from the saw band (1).

3. A saw band guide according to claim 1, wherein the hard metal bodies (4a, 4b) are triangular plates.

4. A saw band guide according to claim 1, wherein the fork branches (2a, 2b) are bent opposite to the direction (L) in which the band runs, and the roller (3) is disposed behind the bent fork branches (2a, 2b).

5. A saw band guide according to claim 1, wherein the hard metal bodies (4a, 4b) consist of a block which is anchored between the fork branches (2a, 2b) and is parted in the center to form a guide gap (4c) for the saw band (1).

6. A saw band guide according to claim 1, wherein the unserrated rear edge of the saw band is guided along the periphery of the supporting roller (3).

* * * * *